US007527405B2

(12) United States Patent
Tatsukawa

(10) Patent No.: US 7,527,405 B2
(45) Date of Patent: May 5, 2009

(54) INFRARED PROJECTOR FOR VEHICLE

(75) Inventor: Masashi Tatsukawa, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 388 days.

(21) Appl. No.: 11/274,672

(22) Filed: Nov. 15, 2005

(65) Prior Publication Data

US 2006/0232395 A1 Oct. 19, 2006

(30) Foreign Application Priority Data

Nov. 15, 2004 (JP) ............................ 2004-330333

(51) Int. Cl.
*B60Q 1/00* (2006.01)

(52) U.S. Cl. ....................... 362/538; 362/543; 362/544; 362/545; 362/231; 362/230; 362/240; 362/244

(58) Field of Classification Search ................. 362/538, 362/543, 545, 231, 228, 230, 240, 244, 544; 250/330

See application file for complete search history.

(56) References Cited

U.S. PATENT DOCUMENTS 5,997,163 A * 12/1999 Brown ........................ 362/553
6,603,137 B2 * 8/2003 Hochstein ................... 250/573
6,736,524 B2 * 5/2004 Albou ........................ 362/228
6,776,513 B2 * 8/2004 Albou ........................ 362/507
7,150,552 B2 * 12/2006 Weidel ....................... 362/545
2005/0213341 A1 * 9/2005 Wehner ...................... 362/545
2006/0164853 A1 * 7/2006 Moisel ....................... 362/545

FOREIGN PATENT DOCUMENTS

JP 2002-219993 8/2002
JP 2003-19919 1/2003

OTHER PUBLICATIONS

Patent Abstracts of Japan, Publication No. 2002-219993 dated Aug. 6, 2002, 2 pages.
Patent Abstracts of Japan, Publication No. 2003-019919 dated Jan. 21, 2003, 2 pages.

* cited by examiner

*Primary Examiner*—Ali Alavi
*Assistant Examiner*—Evan Dzierzynski
(74) *Attorney, Agent, or Firm*—Osha • Liang LLP

(57) ABSTRACT

An infrared projector for a vehicle using a semiconductor light-emitting element that prevents a lens from becoming reddish by a red light component generated with infrared rays includes: a semiconductor light-emitting element for generating infrared rays and a red light component; and a lens for irradiating in a forward direction the infrared rays and the red light component from said semiconductor light-emitting element. The infrared projector for a vehicle further includes a light source for generating white light and emitting the white light from the light source incident on the lens. Use of scattered light reduces the influence of a red light component passing through the lens.

17 Claims, 3 Drawing Sheets

INFRARED PROJECTOR FOR VEHICLE

BACKGROUND OF INVENTION

1. Field of the Invention

The present invention relates to a technology for preventing a lens from appearing red in an infrared projector for a vehicle using a semiconductor light-emitting element and a lens during irradiating the infrared rays.

2. Background Art

There is known an infrared noctovision camera system that makes visible, by using infrared rays, an obstacle that is difficult to perceive with visible light illumination during night traveling. As an active-type device of such a system, an infrared projector is used.

For example, an example is known in which a projector is downsized by using reflected light or direct light depending on their functions in a configuration including an infrared light-emitting diode (LED) and an reflector (for example, refer to JP-A-2002-219993).

Another example is known in which red light emission of the lens is prevented by causing emission of white light on the periphery of a lens or emitting a small amount of white light from the center of the lens in a configuration including an infrared light transmission film reflecting a visible light component and transmitting an infrared light component in a lighting room defined by a lens and a lamp body (for example, refer to JP-A-2003-19919).

SUMMARY OF INVENTION

As the intensity of infrared rays generated by using a semiconductor light-emitting element such as an LED becomes larger, the intensity of the red light component becomes non-negligible. Without some countermeasure, a lens becomes reddish during irradiation of infrared ray, which may lead to misidentification concerning the function color of a tail lamp or a stop lamp.

A related art configuration has problems in that the effect of efforts to make the red light component less conspicuous is insufficient and that the configuration is more complicated and involves higher costs.

One or more embodiments of the invention provide a simple configuration that prevents a lens from becoming reddish by a red light component generated with infrared rays at light emission of a semiconductor light-emitting element One or more embodiments of the invention provide an infrared projector for a vehicle comprising: a semiconductor light-emitting element for generating infrared rays and a red light component; and a lens for irradiating in forward direction the light from said semiconductor light-emitting element; characterized in that said infrared projector for a vehicle further comprises a light source for generating white light and causes the white light from the light source incident on the lens as scattered light.

One or more embodiments of the invention are capable of alleviating the influence of a red light component passing through a lens using white light introduced into a lens as scattered light.

According to one or more embodiments of the invention, it is possible to obtain, by way of scattered light (white light) the effect (mask effect) of making less conspicuous the red light component generated with infrared rays at light emission of a semiconductor light-emitting element. This prevents confusion about the function color of a lighting tool (red color).

Use of a light-emitting diode as a light source to generate white light is advantageous in downsizing an infrared projector for a vehicle.

Use of a Fresnel lens readily obtains a scattering effect by utilizing edge light in the Fresnel zone thus simplifying the overall configuration. That is, no additional means is required to obtain scattered light. Other aspects and advantages of the invention will be apparent from the following description and the appended claims.

DETAILED DESCRIPTION

The invention aims at reducing the influence of red light that accompanies irradiation of infrared rays in the application of the invention in an infrared projector for a vehicle using a semiconductor light-emitting element such as a light-emitting diode, and proposes a configuration without drawbacks such as a complicated optical configuration.

Figure 1:
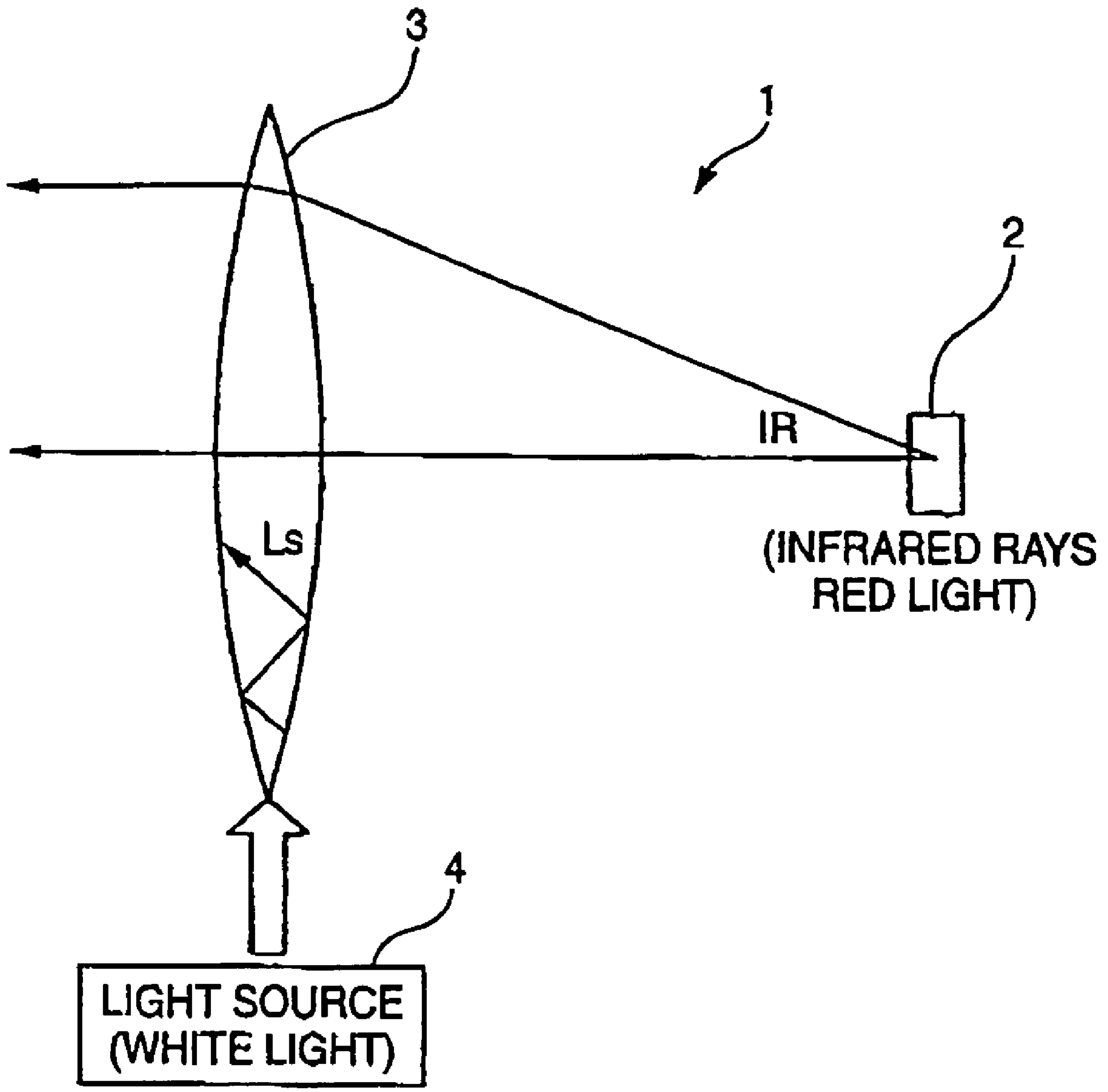
FIG. 1 is a conceptual illustration showing an example of basic configuration of an infrared projector for a vehicle according to one embodiment of the invention.

FIG. 1 is a conceptual illustration showing an example of basic configuration of an infrared projector for a vehicle according to the invention.

An infrared projector for a vehicle 1 comprises a semiconductor light-emitting element 2, a lens 3, and a light source (white color light source) 4.

The semiconductor light-emitting element 2 uses a light-emitting diode and generates a red light component in association with emission of infrared rays.

The lens 3 is provided to irradiate in forward direction the light from the semiconductor light-emitting element 2. The lens 3 transmits infrared light (infrared rays and red light).

The light source 4 generates white light. The white light from the light source is incident on the lens 3 as scattered light as shown by "Ls" in FIG. 1. Part of the light emitted out of the lens is irradiated in forward direction. The white light introduced into the lens 3 acts as scattered light to have a mask effect on the red light, thereby eliminate coloring so that the lens 3 will not appear reddish.

Forms of introduction of white light from the light source 4 into the lens 3 include a configuration using a light guide member or a coupling lens and a configuration in which white light from the light source 4 is directly incident on a lens without using such optical components.

Figure 2:
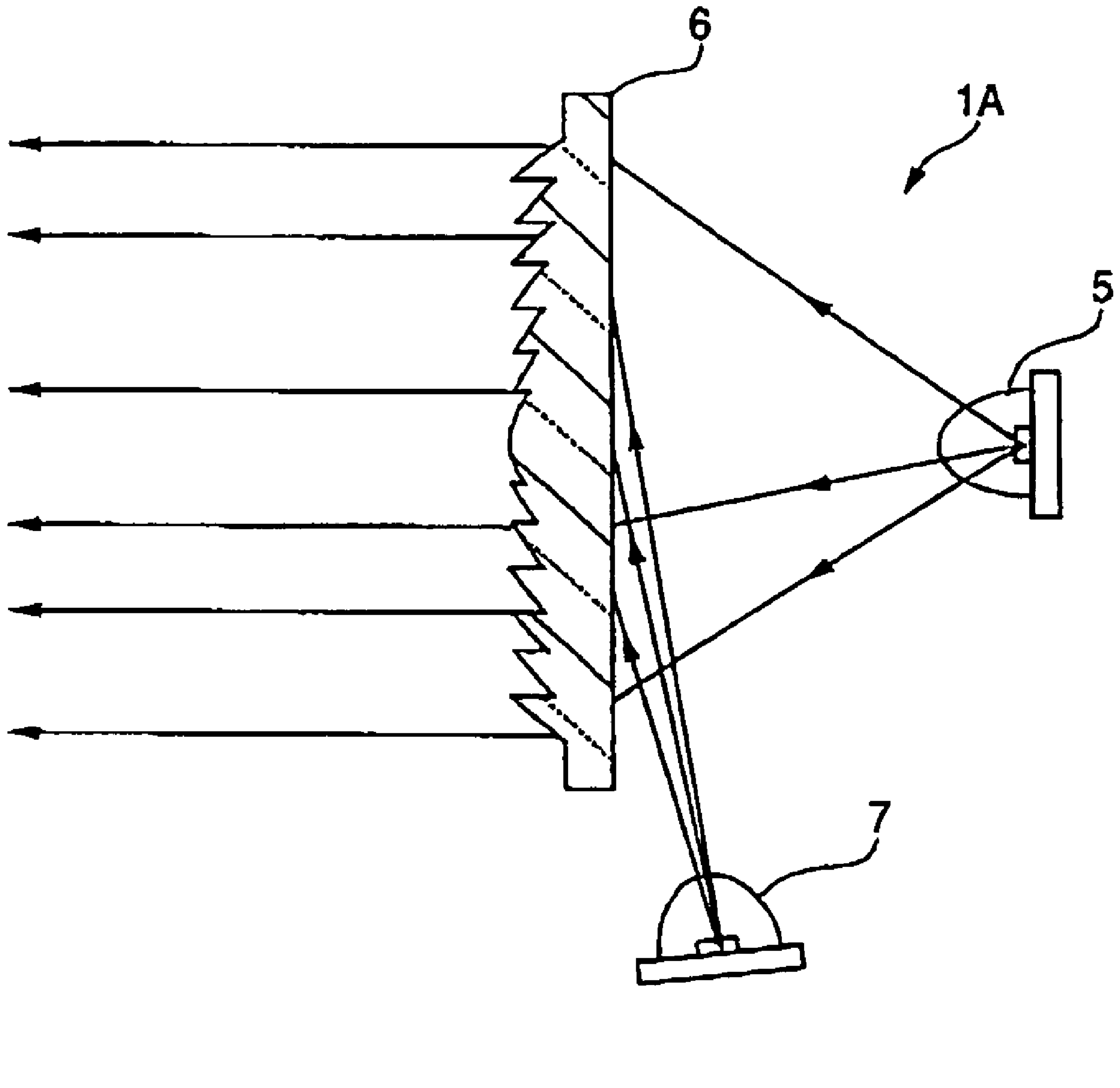
FIG. 2 shows an exemplary configuration of the main parts of an infrared projector for a vehicle according to one embodiment of the invention.

FIG. 2 shows an exemplary configuration of an infrared projector for a vehicle 1A In this example white light is incident from an oblique side of a convex Fresnel lens to utilize edge light in the Fresnel zone.

The infrared projector 1A comprises a light-emitting diode 5 equivalent to the semiconductor light-emitting diode 2, a Fresnel lens 6, and a light-emitting diode 7 as a white light source.

In this example, the light-emitting diode 7 is used to emit its white light directly incident on the back surface (surface opposite to the irradiation direction) of the Fresnel lens at a small angle from an oblique side and emit the light in forward direction after it is scattered in the lens, thereby making the red color on the lens surface less conspicuous and preventing unwanted white light from being emitted in forward direction.

Scattering at the edge of the Fresnel lens 6 is expected. This eliminates the need for optical components for scattering or machining of a lens for scattering.

While using a white color light-emitting diode is considered in the above example, a configuration is also possible using an electroluminescent (EL) element. A configuration using a direct light from the light-emitting diode 5 as well as a configuration using an infrared light-emitting diode and a reflector may be used.

Figure 3:
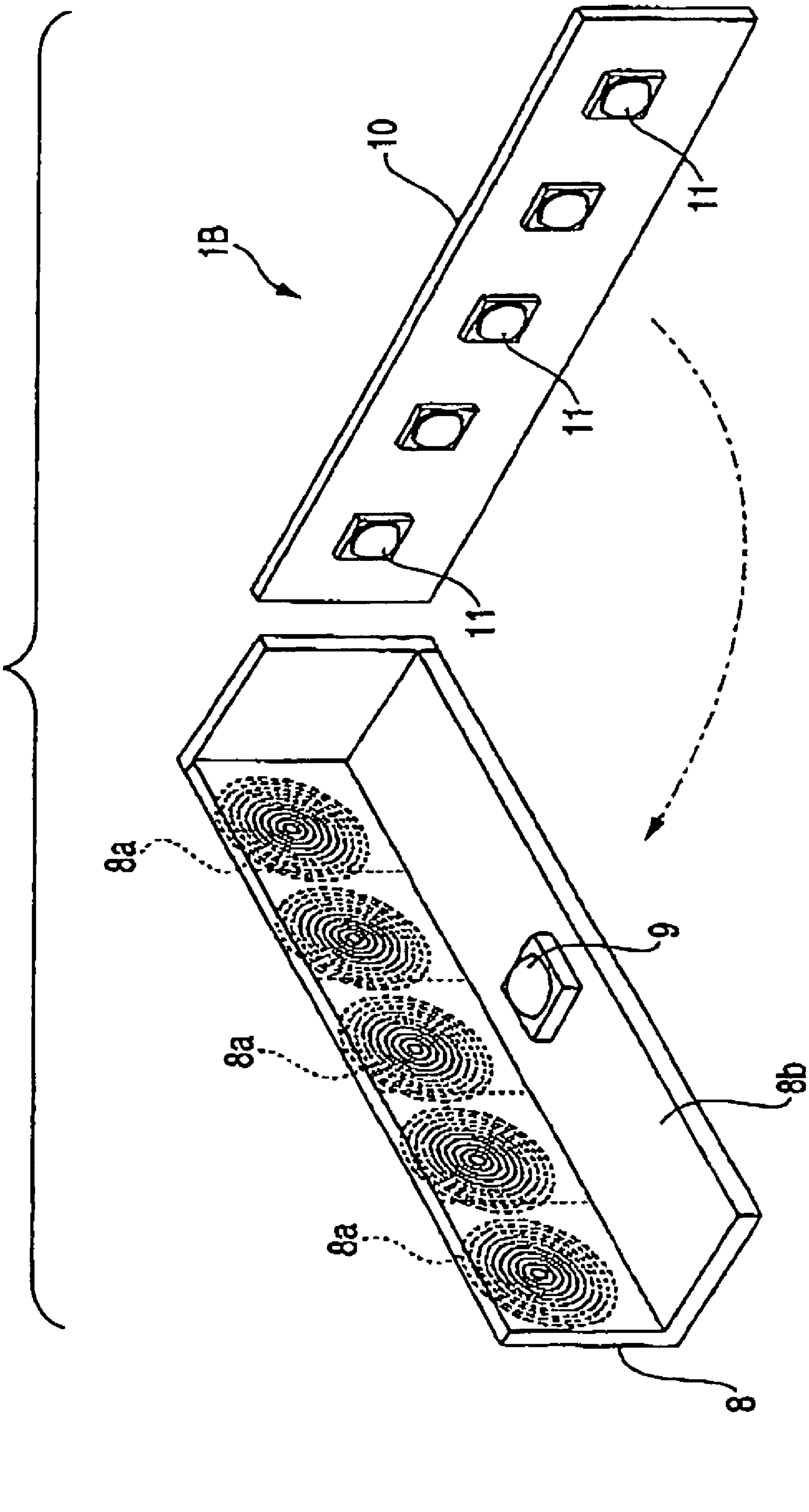
FIG. 3 is an exploded perspective view of an exemplary configuration of an infrared projector for a vehicle according to one embodiment of the invention.

FIG. 3 illustrates the configuration of a light source unit including a lens and a light source.

An infrared projector for a vehicle 1B comprises a lens body 8, a white light source 9, and a light source part 10.

The lens body 8 is in the form of an L-shaped channel using a synthetic resin that transmits infrared rays and has a plurality of Fresnel lenses 8*a* formed on its front surface (part where a lens is formed).

The white light source 9 uses a light-emitting diode which attached to the base 8*b* of the lens body 8. White light from the light-emitting diode is incident on the back surface (incidence surface) of the Fresnel lenses 8*a* at a small angle from an oblique side thereof.

The light source part 10 has a plurality of infrared light-emitting diodes 11 and the light emitting part of each of the light-emitting diodes 11 is arranged almost at the focal position corresponding to each of the Fresnel lenses 8*a* in a state where the light source 10 is coupled with the lens body 8.

When the infrared projector for a vehicle 1B is turned on, the white color light-emitting diode and the infrared light-emitting diode are illuminated. In this example, only one white color light-emitting diode common to the plurality of Fresnel lenses 8*a* is used, which simplifies the system configuration. Light intensity of the white color light-emitting diode is a small value sufficient to cancel the influence of red light, and the resulting power consumption is negligible.

The above configuration provides the following advantages:

It is possible to provide an infrared projector for a vehicle using a light-emitting diode that solves the problem of a lens surface illuminated in red as seen from the front due to a red light component from the light-emitting diode (with masking effect of white light incident on the lens).

In case a filter member is used to shield red light, there may arise an influence on the light distribution pattern specific to infrared rays or a drop in the efficiency. Embodiments of the invention are free from such problems, that is, embodiments of the invention eliminate coloring of red using white light rather than reducing the intensity of red light By using the scattering of light incident on a Fresnel lens, it is possible to simplify the system configuration and reduce costs.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An infrared projector for a vehicle comprising:

a semiconductor light-emitting element operable to generate infrared rays and a red light component; and a lens configured to irradiate in a forward direction the infrared rays and the red light component from said semiconductor light-emitting element;

wherein said infrared projector for a vehicle further comprises a light source operable to emit white light, disposed at an oblique side of a back surface of the lens, wherein said infrared projector is configured to emit the white light from the light source incident on the lens as scattered light, and wherein all the white light emitted by the light source makes an acute angle with an incident surface of the lens.

2. The infrared projector for a vehicle according to claim 1, wherein the light source is a light-emitting diode.

3. The infrared projector for a vehicle according to claim 2, wherein the lens is a Fresnel lens.

4. The infrared projector for a vehicle according to claim 3, further comprising:

a second semiconductor light-emitting element operable to generate infrared rays and a red light component; and a second lens configured to irradiate in a forward direction the infrared rays and the red light component from said second semiconductor light-emitting element, wherein the light source generates scattered light for the lens and the second lens.

5. The infrared projector for a vehicle according to claim 2, further comprising:

a second semiconductor light-emitting element operable to generate infrared rays and a red light component; and a second lens configured to irradiate in a forward direction the infrared rays and the red light component from said second semiconductor light-emitting element, wherein the light source generates scattered light for the second lens.

6. The infrared projector for a vehicle according to claim 1, wherein the lens is a Fresnel lens.

7. The infrared projector for a vehicle according to claim 6, further comprising:

a second semiconductor light-emitting element operable to generate infrared rays and a red light component; and a second lens configured to irradiate in a forward direction the infrared rays and the red light component from said second semiconductor light-emitting element, wherein the light source generates scattered light for the second lens.

8. The infrared projector for a vehicle according to claim 1, further comprising:

a second semiconductor light-emitting element operable to generate infrared rays and a red light component; and a second lens configured to irradiate in a forward direction the infrared rays and the red light component from said second semiconductor light-emitting element, wherein the light source generates scattered light for the second lens.

9. The infrared projector for a vehicle according to claim 1, wherein the light source is an electroluminescent (EL) element.

10. An infrared projector for a vehicle comprising:

a semiconductor light-emitting element operable to generate infrared rays and a red light component; and a lens configured to irradiate in a forward direction the infrared rays and the red light component from said semiconductor light-emitting element;

wherein said infrared projector for a vehicle further comprises a light source operable to emit white light disposed below the lens, and wherein said infrared projector is configured to emit the white light from the light source incident on the lens as scattered light wherein all the white light emitted by the light source makes an acute angle with an incident surface of the lens.

11. An infrared projector for a vehicle comprising:

an infrared light-emitting light source for generating infrared rays;

a lens body comprising a lens that transmits the infrared rays in a forward direction; and a white light-emitting light source operable to emit white light, disposed at an oblique side of a back surface of the lens, wherein the white light is emitted incident on the lens as scattered light, and wherein all the white light emitted by the light source makes an acute angle with an incident surface of the lens.

12. The infrared projector for a vehicle of claim 11, wherein the white light-emitting light source is a light-emitting diode.

13. The infrared projector for a vehicle of claim 11, wherein the front surface of the lens comprises a Fresnel lens.

14. The infrared projector for a vehicle of claim 11, wherein the lens body is formed in an L-shaped channel having a front surface and a base, and the white light-emitting light source is attached to the base of the lens body.

15. The infrared projector for a vehicle of claim 14, wherein the white light-emitting light source is disposed on the base of the lens body so as to emit white light incident on the front surface of the lens at a small angle from an oblique side thereof.

16. The infrared projector for a vehicle of claim 14, wherein the front surface of the lens comprises a plurality of Fresnel lenses.

17. The infrared projector for a vehicle of claim 16, further comprising a plurality of infrared light-emitting light sources arranged respectively at about a focal position corresponding to each of the plurality of Fresnel lenses, and the white light-emitting light source emits scattered light through each of the plurality of Fresnel lenses.

* * * * *